United States Patent [19]

Bergstrom et al.

[11] Patent Number: 4,796,746

[45] Date of Patent: Jan. 10, 1989

[54] DEVICE FOR BRAKING ARTICLES TO BE CONVEYED ON A CONVEYER AND BRAKING RUBBER TUBES THEREFOR

[75] Inventors: Anders Bergstrom; Gösta Sevrell, both of Lund, Sweden

[73] Assignee: AB Tetra Pak, Lund, Sweden

[21] Appl. No.: 119,645

[22] Filed: Nov. 12, 1987

[30] Foreign Application Priority Data

Nov. 13, 1986 [JP] Japan .................. 61-270397

[51] Int. Cl.⁴ .......................................... B65G 47/29
[52] U.S. Cl. .................. 198/463.4; 198/633; 188/67
[58] Field of Search ........... 198/633, 634, 636, 463.4, 198/463.6, 346.2, 534; 193/32, 40; 104/248-252; 188/67; 406/83, 84

[56] References Cited

U.S. PATENT DOCUMENTS

| | | | |
|---|---|---|---|
| 2,761,633 | 9/1956 | Sindzinski | 193/32 X |
| 3,464,529 | 9/1969 | Horsky, Jr. | 193/32 |
| 3,489,258 | 1/1970 | Stokes | 193/32 |
| 3,705,554 | 12/1972 | Aksamit | 104/250 |
| 4,470,484 | 9/1984 | Norgren | 188/67 |
| 4,511,030 | 4/1985 | Lem | 198/633 |
| 4,627,526 | 12/1986 | Masciareli | 198/633 X |

*Primary Examiner*—Robert J. Spar
*Assistant Examiner*—D. Glenn Dayoan
*Attorney, Agent, or Firm*—Koda and Androlia

[57] ABSTRACT

A device for braking advancing packages being transferred on a conveyer including a pair of rubber tubes of a predetermined length having flat surfaces, the tubes being inflated toward the packages being conveyed so that the tubes interpose and stop the packages. The pair of rubber tubes can be inflated so that they expand in an upwardly inclined direction in order to slightly lift the packages above the conveyer surface. Each of the rubber tubes are provided along the conveyer and are inflated with air. In addition each rubber tube has a flat braking surface, a reinforcing part at the back of the braking surface for maintaining the flatness of the braking surface, attaching wall part and a hollow section between the braking surface and the attaching wall part so that the rubber tube is normally small and narrow, but can be enlarged when inflated with air.

4 Claims, 3 Drawing Sheets

DEVICE FOR BRAKING ARTICLES TO BE CONVEYED ON A CONVEYER AND BRAKING RUBBER TUBES THEREFOR

BACKGROUND OF THE INVENTION

1. Field of the Invention

The present invention relates to a braking system and rubber tubes utilized with the braking system for temporarily stopping the transfer of articles such as paper packages containing liquid foods, etc. on a conveyer in a production line.

2. Prior Art

Work on a production of packages which contain liquid food such as milk, juice, etc. has conventionally been repeated as required to temporarily hold and release several of the packages continuously transferred on a conveyer which has a flat transfer surface for distribution purposes, etc. In such a case, rectangular-shaped braking plates that can be freely advanced or withdrawn are provided along the conveyer having a flat surface to appropriately hold and release the article to be conveyed.

This method often causes problems such as the surface of the paper packages being partially damaged by the braking plates since the paper packages are relatively soft and they must be held by rigid braking plates.

SUMMARY OF THE INVENTION

The present invention was devised taking the above described problems into consideration.

In the braking device of the present invention, a pair of rubber tubes of a predetermined length are inflated toward the side surfaces of an article being conveyed or in the upward direction of both of the sides of the article. The rubber tubes interpose a conveyer having a flat surface. The braking surfaces of the tubes which are flat and inflated are provided on the inside of a pair of side walls of the conveyer so that the article being conveyed on the traveling conveyer can pass therethrough and the article is interposed between the rubber tubes when they are inflated with air. Side guide elements for guiding the article are provided adjacent to the upper portions of each side wall and the lower portion of each rubber tube interposing the rubber tubes between them, and by feeding air into the rubber tubes, thus, the conveyed articles halt and movement of the articles is stopped. Furthermore, by using rubber tubes which can inflate and project in an upwardly inclined direction, the article interposed between the inflated rubber tubes is lifted slightly up from the surface of conveyer and stopped.

The rubber tubes for braking articles of the present invention are utilized with a braking device. The braking tubes are provided with a wall which is normally narrow and small, but expands when inflated with air. The tubes have a flat braking surface, a reinforcing part to keep the braking surface flat and are further provided with an attaching wall to be attached to an attaching wall part for attaching the tube to side walls provided along the conveyer.

Furthermore, in the rubber tubes which are inflated in an upwardly inclined direction, the braking surface is connected to a front face of an attaching wall via a pair of walls which are of different thicknesses so that the tube forms an approximate parallelogram.

The device according to the present invention feeds compressed air into the pair of rubber tubes facing each other. The rubber tubes are thus inflated and the braking surfaces, which are flat and elastic, quickly interpose and brake the article on the conveyer. The article is stopped on the moving conveyer without suffering adverse effects such as damage to the package, etc.

The inflated rubber tubes slightly lift the articles being conveyed from the traveling surface of the conveyer when the braking surfaces of the tubes move in an upwardly inclined direction and interpose the article therebetween so that the bottom of the article is prevented from being damaged.

Furthermore, according to the present invention air is fed into the braking tubes to inflate them, and the reinforced part which maintains the flatness of the braking surface is provided at the back of the flat braking surfaces which interpose the article on the conveyer. Therefore, the braking surfaces can sufficiently and effectively stop the article from being conveyed with its own flat surface. Furthermore, according to the object in which the braking surfaces are interposed with a pair of wall of different thicknesses and the tube is in the form of a parallelogram, the walls of the tube have different elongated proportions and therefore the braking surfaces can shift in an upwardly inclined direction against the attaching surfaces.

BRIEF DESCRIPTION OF THE DRAWINGS

The accompanying drawings show the embodiments of the present invention in which.

DETAILED DESCRIPTION OF THE INVENTION

A description of the embodiment according to the present invention will be made in conjunction with the accompanying drawings.

Figure 1:
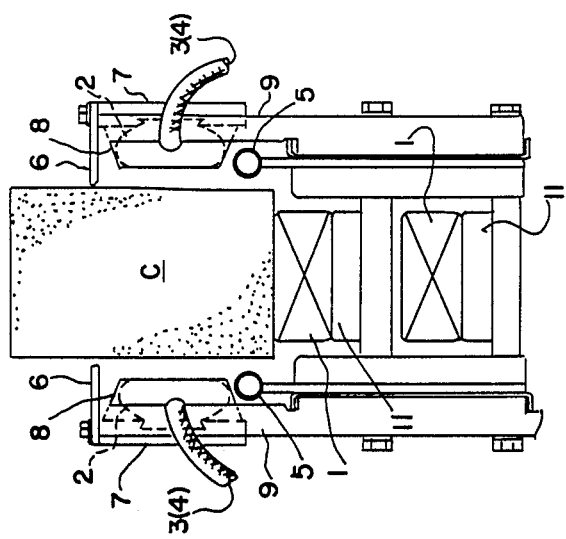
FIG. 1 is a front view of a braking device according to the present invention.
Figure 2:
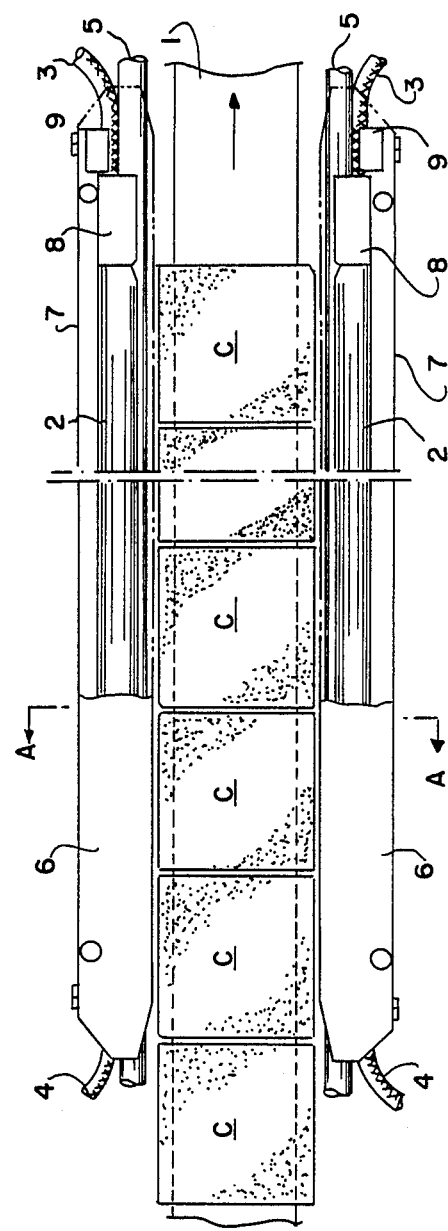
FIG. 2 is a plan view showing the main portion of the braking device.

FIG. 1 is a front view of the braking device according to the present invention and FIG. 2 is a front view showing the main portion of the braking device arranged to brake articles being conveyed on a conveyer which represent paper packages containing liquid foods such as milk and juice.

A conveyer having a flat transfer surface is in a form of a linked chain that is capable of curing in the traveling direction, although that is not illustrated in the drawings. One part of the conveyer is in an upper position and an other part is in a lower portion and they are arranged to move in reverse directions to each other such that both conveyers can make circular movements respectively on the upper and lower supporting plates 11 provided in the braking device and they can be connected to the conveyer supporting plates 11 that are arranged apart from the braking device in accordance with the passage of the conveyer 1. FIG. 2 shows the upper conveyer 1 moving to the right.

On both sides of the supporting plates 11 which are the passages of the conveyer 1 and at positions corresponding to the lower portion of an article C to be conveyed with a predetermined distance, a pair of guide pipes 5 that are defined as side guide members for the article C are provided so that they are connected to other guide pipes provided outside of the braking device. At both ends in a lengthwise direction of the device (left and right directions in FIG. 2) and at the outside of the pipes 5, a pair of supports 9 are provided such that the passage of the article C is interposed with the upper portions of the supports 9.

Mounted on the upper portion of the pair of left and right supports 9 arranged in a lengthwise direction are a pair of side walls 7. The side walls 7 are bases for attaching rubber tubes 2 thereon and are connected respectively to supports 9 so that they face each other with the conveyer passage in between. At each of the side walls 7 facing each other and along the lengthwise direction of the side walls, rubber tubes 2 of a predetermined length are attached by being inserted into dovetail grooves formed on an attaching wall part 2b. The positions of the rubber tubes 2 are determined by clamps 8 at the respective ends thereof.

Air feeding pipes 3 are attached to one side of the clamps 8. Those pipes 3 are respectively connected to electromagnetic valves which are not illustrated. Compressed air is fed via the air feeding pipes 3, and inflation and contraction of the rubber tubes is performed by adequately closing and opening the valves. On the upper side surface of the side walls 7, base plates hold the rubber tubes facing each other for guiding the article C without laterally sliding occurring on the conveyer of the present braking device, and a pair of guide elements 6 in the form of plates having obliquely cut end edge parts at least at the carriage-in end thereof are provided. Thus, the article C can be guided by an adequate space formed between the article C and the guide members 6.

Figure 3A:
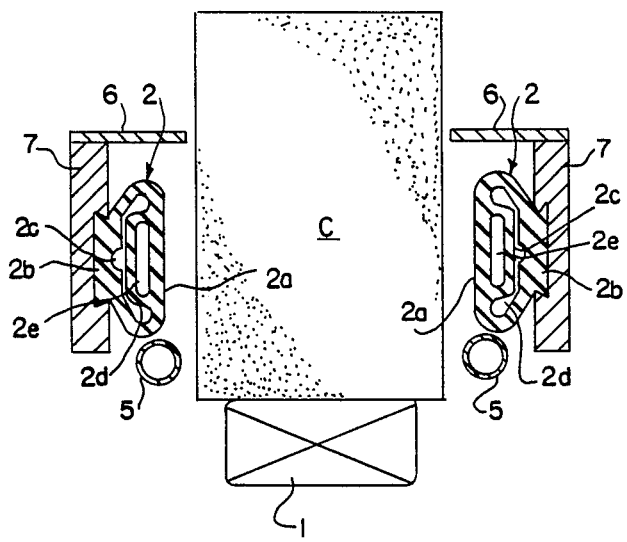
FIG. 3(a) is a schematic, enlarged sectional view taken along the line A—A of FIG. 2, illustrating the relationship between the rubber tubes and the article to be conveyed.
Figure 3B:
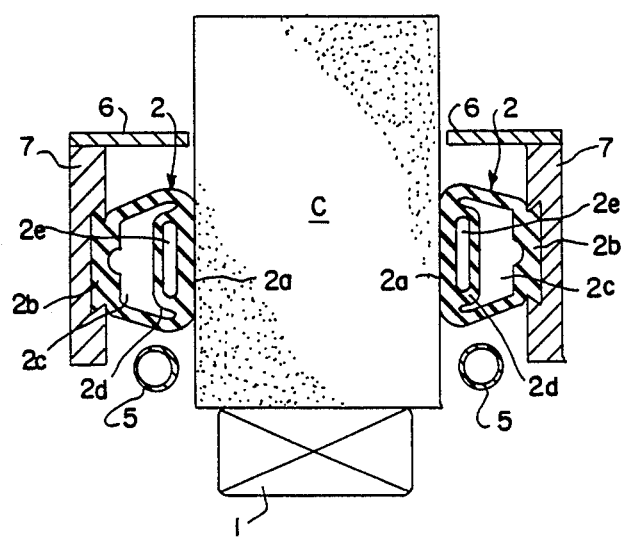
FIG. 3(b) is a sectional view illustrating rubber tubes with air therein so that they are inflated and interpose an article to be conveyed.

The rubber tube 2 is, as shown in FIG. 3(a), provided with a wall part having a flat braking surface 2a, and an attaching wall part 2b and hollow section 2c. This hollow section 2c, provided between the braking surface 2a and the attaching wall part 2b, is narrow and small when air is not fed into the tubes and is inflated when compressed air (as shown in FIG. 3(b)) is fed thereinto. The wall part having the braking surface 2a provided with a reinforcing part 2d having the lightened part 2e at the back of the braking surface (on the side of the hollow section 2c) maintains its flatness so that the braking surface 2a can maintain flatness without being deformed. Thus, it remains in contact with the article C and efficiently performs the braking action.

The braking device of the present invention is installed at a required position in a conveyer line for paper packages that are the articles to be conveyed. When the rubber tubes 2 are inflated by opening the electromagnetic valve, which is not illustrated (the electromagnetic valve on the side of the air exhaust pipe 4 is closed at this time) and by feeding compressed air thereto via the air feeding pipe 3, both sides of the article C on the operating and moving conveyer are interposed by these rubber tubes 2. Consequently, the article is prevented from moving and is kept at a stopped position while sliding on the conveyer (see FIG. 3(b)).

Moreover, it is also possible to lower the moving speed of the article C at the area of the braking device depending on the internal pressure of the rubber tube 2.

The rubber tubes 2 facing each other can be quickly activated because compressed air is fed thereinto via operation of the electromagnetic valve. It is less likely that the article will be damaged since the braking surface is made of rubber and furthermore, since there is no need to operate hard machinery parts, braking section can be performed quietly and smoothly.

Figure 4A:
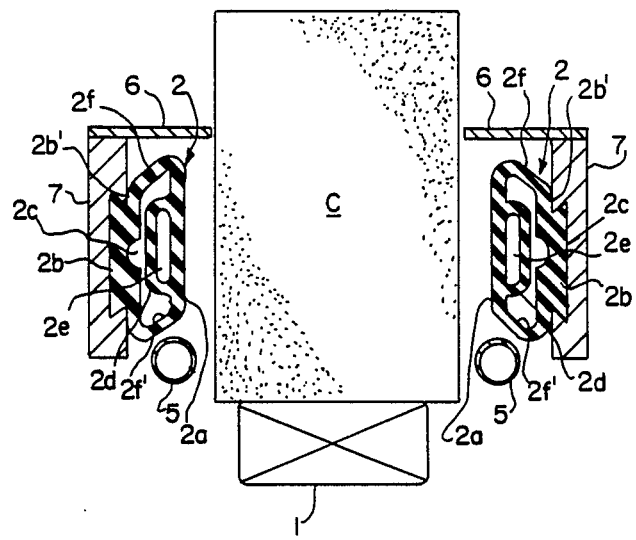
FIG. 4(a) is a schematic, enlarged sectional view illustrating the relationship between the rubber tubes in another embodiment and an article to be conveyed.
Figure 4B:
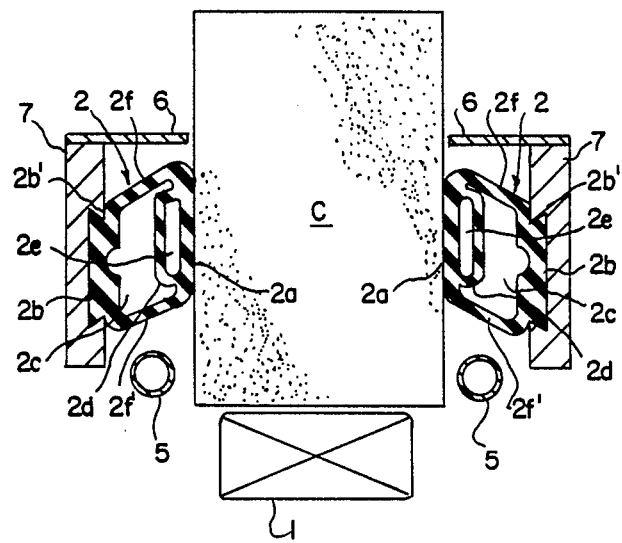
FIG. 4(b) is a sectional view illustrating the rubber tubes of FIG. 4(a) with air therein so that they are inflated to interpose an article to be conveyed.

FIGS. 4(a) and 4(b) are schematic sectional views showing the relationship between the rubber tubes 2 and the articles C to be conveyed in another improved embodiment of the present invention.

The rubber tube 2 is, as is in the previously described embodiment and as illustrated in FIG. 4(a), provided with a wall part having a flat braking surface 2a, an attaching wall part 2b and a hollow section 2c interposed in between. The tube 2 is narrow and small when it is not inflated with air, but may be inflated by feeding compressed air thereinto (see FIG. 4(b)). The wall part on braking surface 2a is provided with a reinforcing part 2d having a lightened part 2e for maintaining the flatness at its back and is connected to the front face wall 2b' of the attaching wall part 2b via a pair of thick walls 2f and thin walls 2f' which are inclined. The tube is formed in an approximate parallelogram with the thick wall 2f positioned upward. The above arrangement makes the elongation proportion greater for the thin wall 2f' than that of the thick wall 2f. Thus, the lower part of the braking surface 2 tends to go up when the rubber tube is inflated. Therefore, when the article C to be conveyed on the conveyer 1 is interposed by the tubes, the article C is lifted slightly above the top surface of the conveyer 1.

Consequently, when the article to be conveyed is interposed with the rubber tubes 2 on the conveyer 1 and stopped, the bottom of the article C is detached from the top surface of the conveyer 1 and the bottom of the article C is prevented from being damaged by rubbing against the top surface of the conveyer 1.

In the present embodiment, the rubber tube 2 whose attaching surface is perpendicular to the transfer surface of the conveyer 1 and whose braking surface 2a is elongated in an upwardly inclined direction is utilized. However, without restriction, it is also possible to obtain the same effect by utilizing a rubber tube with its mounting surface inclined and having a braking surface elongated at a right angle to inclined attaching surface or in the upwardly inclined direction against the conveyer surface and perpendicular to the conveyer surface at the front end.

As is evident from the foregoing description, if the device for braking articles to be conveyed according to this invention is used, when the article to be conveyed such as a liquid package that is carried on the flat transfer surface of the running conveyer is temporarily held for distribution purposes, etc., the article is braked by deforming elastic elements such as rubber tubes using compressed air, instead of utilizing hard plates. Therefore, the device is simple in construction and noiseless and braking action may be swiftly and smoothly performed. Thus, the article be conveyed is prevented from being damaged and it is possible to make fine adjustments to the braking operation since it is done by fed air pressure. It is also possible to provide an excellent device for braking an article to conveyed on a moving conveyer. Furthermore, when the rubber tubes are used as elements to brake an article to be conveyed with the aforementioned braking device, the braking surfaces of the tubes are maintained wide and flat without being deformed or touching the article to be conveyed. Therefore, it is possible to achieve braking by temporarily holding the article to be conveyed.

In addition, in a device in which the braking surface moves in an upwardly inclined direction against the attaching surface, when the rubber tubes are inflated, the articles such as packages, etc. are temporarily lifted up and therefore in this invention the bottoms of the articles can be prevented from being damaged.

We claim:

1. A device for braking articles conveyed on a conveyor comprising:
    a pair of side walls extending along said conveyor;
    a pair of inflatable rubber tubes of a predetermined length with flat braking surfaces adjacent said articles and along said conveyor, said rubber tubes being provided on the inside of said pair of side walls such that said articles on said conveyor can pass between said rubber tubes;
    a means for inflating said pair of rubber tubes such that both sides of said articles are engaged by said rubber tubes when said rubber tubes are inflated; and
    guide members for guiding said articles, said guide members being provided adjacent an upper portion of each of said pair of side walls and a lower portion of each of said rubber tubes.

2. A device for braking articles conveyed on a conveyor comprising:
    a pair of side walls extending along said conveyor;
    a pair of inflatable rubber tubes of a predetermined length with flat braking surfaces adjacent said articles and along said conveyor, said rubber tubes being provided on the inside of said pair of side walls such that said articles on said conveyor can pass between said rubber tubes;
    a means for inflating said pair of rubber tubes such that both sides of said articles are engaged by said rubber tubes when said rubber tubes are inflated; and
    guide members for guiding said articles, said guide members being provided adjacent an upper portion of each of said pair of side walls and a lower portion of each of said rubber tubes;
    wherein said pair of rubber tubes are arranged and configured such that when said pair of rubber tubes are inflated, said braking surfaces move in a direction toward both sides of said article in an upwardly inclined direction so that said article is lifted up slightly from said conveyor surface.

3. Rubber tubes for braking an article conveyed on a conveyor comprising:
    an inflatable rubber tube provided on both sides of said conveyor, said inflatable rubber tube comprising:
    a wall part comprising a flat braking surface;
    a reinforcing part positioned at the back of said braking surface for maintaining the flatness of said braking surface;
    an attaching wall part; and
    a hollow section that is provided between said reinforcing part and said attaching wall part so as to be narrow and small when not inflated, but enlarged when inflated.

4. Rubber tubes for braking an article to be conveyed on a conveyer according to claim 3, characterized in that said wall part having said flat braking surface is connected to a front face wall of said mounting wall part via a pair of walls of different thicknesses to form an approximate parallelogram.

* * * * *